United States Patent [19]

Peters

[11] Patent Number: 4,477,915
[45] Date of Patent: Oct. 16, 1984

[54] DIFFERENTIAL PULSE CODE MODULATION TRANSMISSION SYSTEM

[75] Inventor: Joseph H. Peters, Eindhoven, Netherlands

[73] Assignee: U.S. Philips Corporation, New York, N.Y.

[21] Appl. No.: 447,085

[22] Filed: Dec. 6, 1982

[30] Foreign Application Priority Data

Oct. 13, 1982 [NL] Netherlands .................. 8203950

[51] Int. Cl.³ .................................... H03K 13/22
[52] U.S. Cl. .............................. 375/30; 358/135
[58] Field of Search ............... 375/27, 30, 31, 28; 332/11 D; 340/347 AD, 347 DA; 358/132, 135, 138

[56] References Cited

U.S. PATENT DOCUMENTS 3,973,199  8/1976  Widmer ........................ 375/30
4,292,651  9/1981  Kretz et al. ................. 358/135
4,411,001  10/1983  Van Buul et al. .............. 375/30

OTHER PUBLICATIONS

Dukhovich "A Three-Dimensional Spatial Non-Linear Predictor for Television" IEEE Transaction on Communication May 1978, pp. 578-582.

Primary Examiner—Robert L. Griffin
Assistant Examiner—Stephen Chin
Attorney, Agent, or Firm—Thomas A. Briody; William J. Streeter; Edward W. Goodman

[57] ABSTRACT

Differential pulse code modulation transmission system comprising a transmitter and a receiver. In the transmitter there is subtracted from an information signal x(n) to be transmitted, a prediction signal y(n) for the purpose of generating a difference signal e(n), which is quantized and converted into a quantized difference signal in a quantizing arrangement 6. This difference signal is applied to a prediction circuit 7 for generating the prediction signal. It is also transmitted to the associated receiver. In that receiver a similar prediction signal is generated by means of a similar prediction circuit, which prediction signal is now added to the received quantized difference signal. In order to limit the influence of transmission errors in this transmission system, without an excessive increase in equipment, the quantized difference signal is applied in the transmitter and in the receiver to a cascade arrangement of a non-linear network 16 and an auxiliary prediction circuit 17, which produces an auxiliary prediction signal. Before the quantized difference signal is applied to the prediction circuit, the auxiliary prediction signal is first added thereto.

6 Claims, 16 Drawing Figures

| e(n) | d(n) ; d¹(n) | c(n) ; c¹(n) |
|---|---|---|
| +24 ↔ +255 | +32 | +4 |
| +13 ↔ +23 | +18 | +3 |
| +5 ↔ +12 | +8 | +2 |
| 0 ↔ +4 | +2 | +1 |
| -1 ↔ -4 | -2 | -1 |
| -5 ↔ -12 | -8 | -2 |
| -13 ↔ -23 | -18 | -3 |
| -24 ↔ -255 | -32 | -4 |

DIFFERENTIAL PULSE CODE MODULATION TRANSMISSION SYSTEM

BACKGROUND OF THE INVENTION

(1) Field of the Invention

The invention relates to a transmission system comprising a transmitter and a receiver, for transmitting an information signal, more specifically a video signal, in a digital format obtained by means of differential pulse code modulation (DPCM).

(2) Description of the Prior Art

The transmitter of a transmission system generally comprises a source which produces an information signal, in the analog or the digital form, which must be transmitted to the associated receiver. In a DPCM transmission system, this information signal is first applied to a source encoding circuit, which is here in the form of a DPCM encoder, which comprises a difference producer to which the information signal and a prediction signal are applied and produces a difference signal. This difference signal is applied to a quantizing arrangement which produces a quantized difference signal. The DPCM encoder further comprises a prediction circuit to the input of which the quantized difference signal is applied and at whose output the said prediction signal is produced.

The quantized difference signal occurring at the output of the quantizing arrangement is applied to a channel coding circuit, for example an analog-to-digital converter or a code converter, which converts this quantized difference signal into a digital channel signal which will be designated DPCM signal and consists of a sequence of codewords occurring at a predetermined rate $f_s$, alternatively designated sampling frequency. It should be noted that the inverse quantity $1/f_s$ will be designated sampling period and will be denoted by the symbol T.

The codewords used by the channel coding circuit are transmitted via a transmission means to the associated receiver where they are converted in a channel decoding circuit into a decoded channel signal which, in the case of non-disturbed transmission, accurately corresponds to the original quantized difference signal. This decoded channel signal is further applied to a DPCM decoding arrangement. The latter comprises a summing arrangement to which the decoded channel signal and a second prediction signal are applied and which produces a sum signal. This DPCM decoding arrangement also comprises a prediction circuit, the decoded channel signal being applied to its input and the second prediction signal being produced at its output. The prediction circuit in the transmitter is of a similar construction as the prediction circuit in the receiver in order to achieve that the sum signal accurately corresponds to the original information signal.

In order to obtain an impression of the operation of the prediction circuit, it is customary to divide each line of the TV picture into a series of picture elements, each having a given picture value, that is to say brightness and/or color. The prediction circuit produces a prediction value for each picture element. More specifically, it holds that the prediction value for an actual picture element is equal to the sum of a number of picture values associated with different picture elements, each picture value being weighted with a weighting factor which is characteristic of the relevant picture element. These weighting factors are chosen such that their mathematical sum is not more than one. If the prediction circuit is of such an implementation that for the determination of the prediction value for an actual picture element it only takes account of the picture values of one or more picture elements belonging to the same line as the actual picture element, then a one-dimensional prediction is involved. If, in contrast therewith, account is taken of picture values of a number of picture elements which belong to lines different than those to which the actual picture element belongs, then two-dimensional prediction is involved. When, analogous to the foregoing, also picture values belonging to picture elements of preceding pictures are used, then three-dimensional prediction is involved.

As will be obvious from the foregoing, a prediction circuit can be implemented in different manners. Possible implentations are decribed in, for example, the reference 1, 2, 3, 4, 5 and 6. From these references, it will be clear that generally a prediction circuit is in the form of a recursive time-discrete filter, in the majority of cases a recurve digital filter.

Because of the recursive behavior of this filter, each received codeword contributes in the receiver to the formation of the picture values of a number of picture elements. This number will be denoted signal response number hereinafter. If now a codeword is disturbed in the transmission means, then the associated picture values of a number of picture elements will also be disturbed. This number of visibly disturbed picture elements is equal to the signal response number.

The signal response number is closely related to the magnitude of the mathematical sum of the weighting factors used in the prediction circuit. If this mathematical sum is equal to unity, then the signal response number is infinitely large and, after the occurrence of a transmission error, each picture element will be further disturbed. If the mathematical sum of the weighting factor is chosen below unity, then the signal response number decreases and consequently also the number of disturbed picture elements, but the quality of the TV picture becomes poorer. The highest picture quality is obtained when the sum of the weighting factors is equal to unity.

In order to obtain the situation that in a DPCM transmission system in which prediction circuits are used having weighting factors whose mathematical sum is equal to unity, a reduction of the number of disturbed picture elements is nevertheless effected after the occurrence of a transmission error without the picture quality becoming poorer, it is proposed in the reference 7, 8 and 9 to add in the transmitter an error reducing signal to the DPCM signal. This error reduction signal is produced by an error reducing circuit to which the information signal itself, or the prediction signal is applied. In the associated receiver, an error reducing signal is subtracted from the received sum signal, as a result of which the original DPCM signal is obtained again when no transmission errors have occurred. This error reducing signal is generated by a local error reducing circuit to which a signal generated in the DPCM decoding arrangement is applied. A transmission system of such a type is known as a "Hybrid DPCM transmission system".

In actual practice this prior art transmission system has been found to come fully up to expectations, provided one-dimensional prediction is used in the prediction circuit. If multi-dimensional prediction is used, then the influence of transmission errors has been found to be considerably greater than in the event that one-dimension prediction is used.

In order to keep, in a DPCM transmission system, the influence of transmission errors as small as possible, even if multi-dimension prediction is used in the system, reference 10 proposes to form the prediction circuit in both the transmitter and the receiver from two or more prediction channels, which are each provided by a non-linear network followed by a recursive digital filter, the mathemetical sum of the weighting factors of which is less than unity. The inputs of these non-linear networks are connected to the inputs of the prediction circuit. The outputs of the recursive digital filters are connected to the inputs of an adder arrangement, the output of which is connected to the output of the prediction circuit. The recursive digital filters are all of a similar structure and a unique system of weighting factors is associated with each filter. This transmission system has the disadvantage that in practice it has been found that each factor must have a very high arithmetic accuracy. The weighting factors must, for example, be so accurate that 12 to 14 bits are required for their presentation. This means that a considerable number of components is required for the implementation of these filters.

OBJECT AND SUMMARY OF THE INVENTION

The invention has for its object to provide a DPCM transmission system with which, relative to the transmission system described in reference 10, a considerable savings in equipment is accomplished, and which transmission system, without this having a negative effect on the picture quality, has a small signal response number, independent of the fact whether one or multi-dimension prediction is employed.

According to the invention, the DPCM encoding and decoding arrangements further comprise:

a non-linear network having an input and an output, the quantized difference signal or the decoded channel signal, respectively, being applied to this input and this network effecting a non-linear operation on the instantaneous value of the signal applied to it;

an auxiliary prediction circuit for generating an auxiliary prediction signal and having an input and an output, the input being connected to the output of the non-linear network;

means for adding the auxiliary prediction signal to the quantized difference signal which is applied to the first prediction circuit, or to the decoded channel signal which is applied to the second prediction circuit, respectively.

REFERENCES

1. An experimental differential p.c.m. encoder-decoder for View-phone signals; G. A. Gerrard, J. E. Thompson; The Radio and Electronic Engineer, Vol. 43, No. 3, March 1973, pages 201–208.

2. Differential PCM for Speech and Data Signals; J. B. O'Neal, R. W. Stroh, IEEE Transactions on Communications, Vol. COM-20, No. 5, October 1972, pages 900–912 (FIG. 1 in particular).

3. Differential Pulse Code Modulation with Two-Dimensional Prediction for Video Telephone Signals: T. Thoma; Nachrichtentechnische Zeitschrift, Jahrgang 27, Heft 6, 1974, pages 243–249 (FIGS. 6a, b, c in particular).

4. Predictive Quantizing of Television Signals; R. E. Graham; I.R.E. Wescon Convention Record, Part IV, August 1958, pages 147–156 (FIG. 6 in particular).

5. Digital Image Processing; W. K. Pratt; John Wiley and Sons, 1978 (ISBN 0-471-01888-0), pages 641–657.

6. Dreidimensional DPCM mit Entropiecodierung und adaptiven Filter; J. Burgmeier; Nachrichtentechnische Zeitschrift, Jahrgang 30, Heft 3, 1977, pages 251–254.

7. Hybrid D-PCM for Joint Source/Channel Encoding; Th. M. M. Kremers, M. C. M. van Buul; Tijdschrift voor het Nederlands Elektronika- en Radiogenootschap, deel 44, nr. 5/6, 1979 pages 257–261.

8. Transmission System by Means of Time Quantization and Trivalent Amplitude Quantization; U.S. Pat. No. 4,099,122 dated July 4, 1978, this patent is equivalent to the Netherlands Patent Application No. 7506987.

9. Hybrid D-PCM, A combination of PCM and DPCM; M. C. W. van Buul; IEEE Transaction on Communications, Vol. COM-26, No. 3, March 1978, pages 362–368.

10. Differential Pulse Code Modulation Transmission System; co-pending U.S. patent application Ser. No. 434,982, filed Oct. 18, 1982, corresponding to Netherlands Patent Application No. 8105196 (PHN 10.192).

SHORT DESCRIPTION OF THE FIGURES

FIG. 7 shows a transmitter and

FIG. 9 shows the transfer characteristic and

DESCRIPTION OF THE EMBODIMENTS (1) The prior art DPCM transmission system

Although, as is known, DPCM encoding and decoding arrangements can be implemented in different manners, the following description will be limited to the digital implementation.

Figure 1:
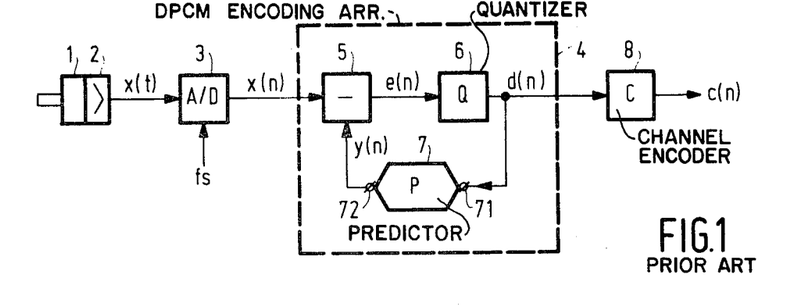
FIG. 1 shows a transmitter of a conventional DPCM transmission system.

FIG. 1 shows an embodiment of a transmitter of the prior art DPCM transmission system. This transmitter comprises a TV camera 1 having a built-in video amplifier 2, which produces an analog video signal x(t). This video signal is applied to an analog-to-digital converter 3, which produces the digital video signal x(n). This analog-to-digital converter 3 is controlled by sampling pulses which occur at a period T. This digital video signal x(n) now represents the information signal to be transmitted to an associated receiver. In order to utilize the capacity of the transmission means to an optimum extent, this information signal is subjected to a source encoding. For that purpose, this signal is applied to a DPCM encoding arrangement 4, which comprises a difference producer 5 to which x(n) and a prediction signal y(n) are applied and which produces a difference signal $e(n)=x(n)-y(n)$. This difference signal is applied to a quantizing arrangement 6, which in customary manner has a non-linear quantizing characteristic and converts this difference signal into a quantized difference signal d(n). This quantized difference signal d(n) is applied to a prediction circuit 7 which has an input 71 and an output 72 and produces the prediction signal y(n). In addition, the quantized difference signal d(n) is subjected to a channel encoding operation and for that purpose is applied to a channel encoding circuit 8, which produces the desired DPCM signal or channel signal c(n) which is transmitted to the receiver.

Figure 2:
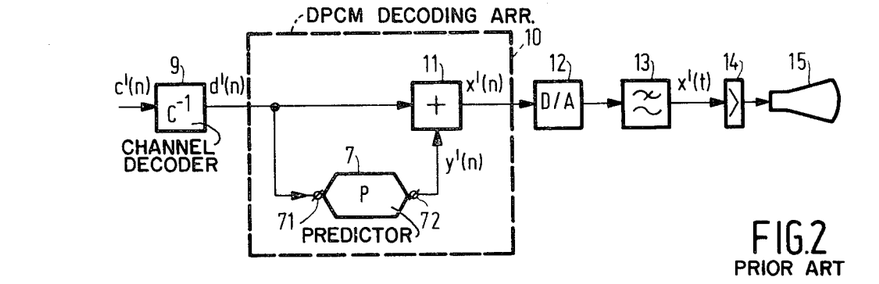
FIG. 2 shows a receiver of a conventional DPCM transmission system.

The receiver shown in FIG. 2 comprises a channel decoding circuit 9 to which the received version c'(n) of the digital channel signal c(n) is applied. The operation of this channel decoding circuit 9 is the opposite of the operation of the channel encoding circuit 8 and it produces the decoded channel signal d'(n), which corresponds to the quantized difference signal d(n). This signal d'(n) is now further applied to a DPCM decoding arrangement 10, which comprises a sum producer 11 to which the signal d'(n) and also a prediction signal y'(n) are applied for generating a sum signal x'(n), which corresponds to the original digital information signal x(n). The prediction signal y'(n) corresponds to the prediction signal y(n) and is derived from the signal d'(n) by means of a prediction circuit. As the prediction circuit in the receiver is perfectly identical to the prediction circuit 7 in the transmitter, the prediction circuit in the receiver is also indicated by the reference numeral 7. The sum signal x'(n) is applied for further processing to a digital-to-analog converter 12, the output of which is connected to the input of a low-pass filter 13 which supplies the video signal x'(t), which corresponds to the analog video signal x(t) and is applied to a display tube 15 via a video amplifier 14.

Figure 3:
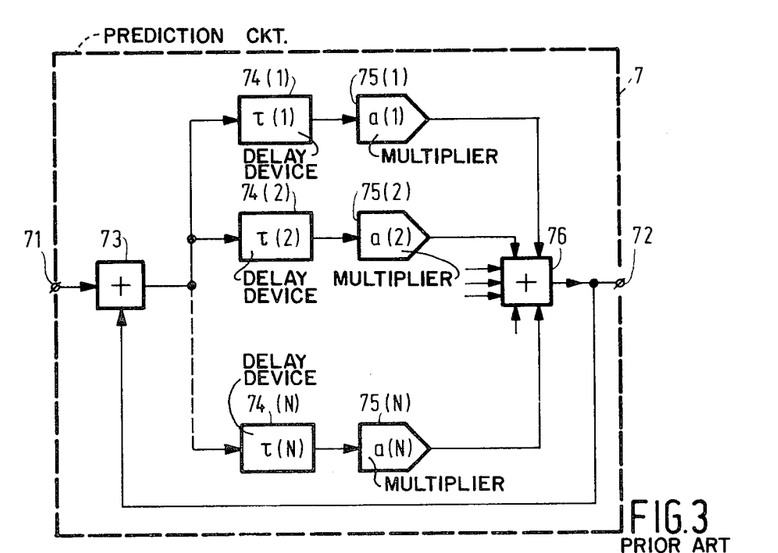
FIG. 3 shows an embodiment of a prediction circuit for use in a DPCM transmission system.

FIG. 3 shows a universal embodiment of a prediction circuit 7, which has the input 71 and the output 72. In addition, it comprises a first sum producer 73, a first input of which is connected to the input 71. The output of this sum producer 73 is connected to inputs of a second sumproducer 76 via N respective delay devices 74(k), to each of which a constant factor multiplier 75(k) is coupled in cascade. The output of this second sum producer is connected to the second input of the first sum producer 73 and also to the output 72 of this prediction circuit 7. It should be noted that for the quantity k, it holds that: $k=1, 2, 3, \ldots N$.

A system of weighting factors a(k) is associated with this prediction circuit 7 of FIG. 3. That is to say that a weighting factor a(k) is associated with the constant factor multiplier 75(k), as a result of which the output signal of the delay device 74(k) is multiplied by the constant weighting factor a(k). Such a weighting factor has an absolute value which is equal to or less than unity, in such manner that the mathematical sum of all the weighting factors is not more than unity.

The delay device 74(k) has a time delay which will be denoted by $\tau(k)$. In practice, N being chosen equal to, for example, three it then holds, for example, that:

$\tau(1)=T \tau(2)=H$ and $\tau(3)=H+T$.

Herein H represents a line period, and thus a two-dimensional prediction is effected. To get an insight in the operation of this prior art DPCM transmission system, let the following be assumed.

1. For the system of weighting factors associated with the prediction circuit its holds that: $a(k)=0$, for $k \neq 1$ or, which is the same, $N=1$ and $\tau(1)=T$. The operation of the transmitter shown in FIG. 1 and of the receiver shown in FIG. 2 can now mathematically be described as follows:

$$y(n)=\{y(n-1)+d(n-1)\}a(1) \quad (1)$$

$$e(n)=x(n)-y(n)$$

$$d(n)=Q\{e(n)\}$$

$$y'(n)=\{y'(n-1)+d'(n-1)\}a(1)$$

$$x'(n)=y'(n)+d'(n)$$

Herein Q{.} represents the quantizing operation performed by the quantizing arrangement 6.

2. The said quantizing operation is defined by the data of the Table shown in FIG. 4. This table should be read as follows.

Figure 4:
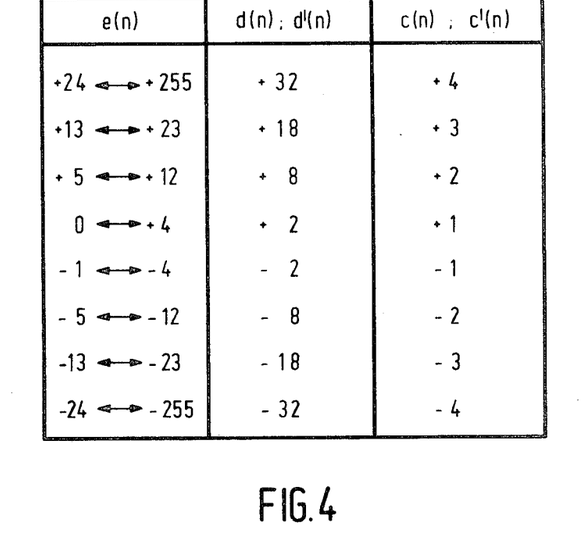
FIG. 4 shows, in the form of a Table, the relationship between several signals occurring in the transmitter and the receiver of this DPCM transmission system.

If e(n) has one of the values $+255, +254, +253, \ldots +26, +25, +24$, then it holds that $d(n)=+32$. If e(n) has one of the values $+23, +22, +21, \ldots +15, +14, +13$ then it holds that $d(n)=+18$, etc. For the sake of completeness, this Table also shows the relationship between d(n) and c(n) and also between c'(n) and d'(n). If, more specifically, $d(n)=+32$, then it holds that $c(n)=+4$. If, in contrast therewith, $d(n)=+18$, then it holds that $c(n)=+3$, etc. If, inversely, $c'(n)=+4$, then it holds that $d'(n)=+32$, etc.

3. $0 \leq x(n), y(n), x'(n), y'(n) \leq 2^8-1$
$-2^8+1 \leq e(n) \leq 2^8-1$

Figure 5:
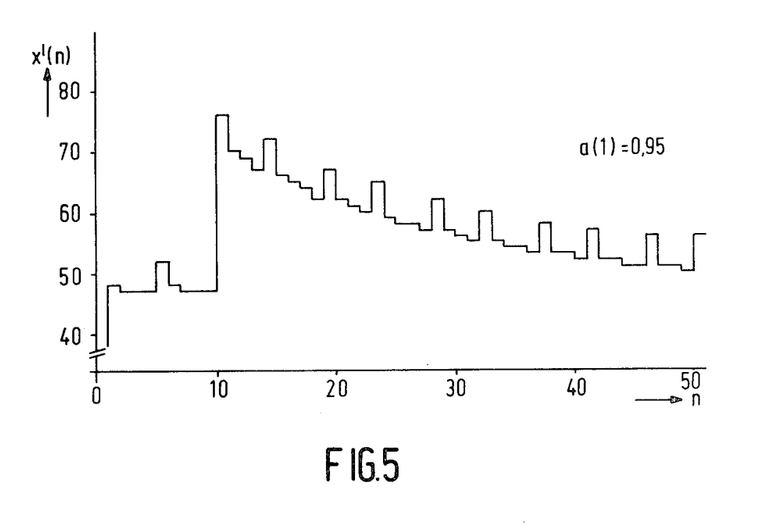
FIG. 5 and FIG. 6 each show a diagram to illustrate the operation of the prior art DPCM transmission system.
Figure 6:
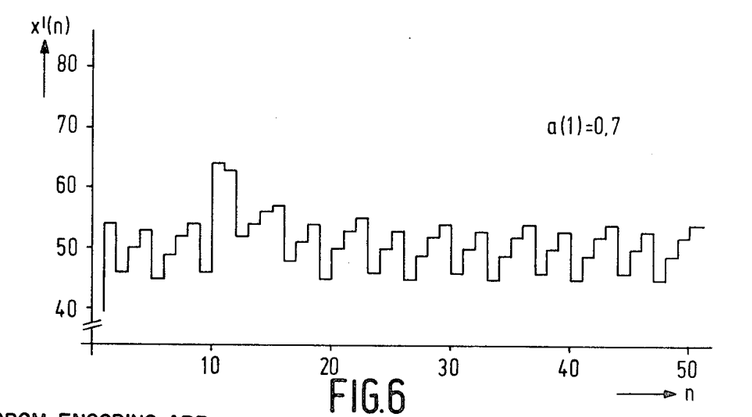

If now there is applied to the DPCM transmission system thus defined an information signal x(n) for which it holds that:

$x(n)=50$ for $n \geq 0$ while $c'(10)=+4$ due to a transmission error and $y(0)=0$ $y'(0)=0$ then the output signal x'(n) of the DPCM decoding arrangement has the form shown in FIG. 5 when $a(1)=0.95$, and the form shown in FIG. 6 when $a(1)=0.7$.

As can be seen from FIG. 5, for a high value (0.95) of the weighting factor a(1), the output signal x'(n) is substantially constant if the input signal x(n) is constant. The influence of a transmission error disappears however very slowly. If a low value is chosen for the weighting factor, then, as can be seen from FIG. 6, the influence of a transmission error has indeed disappeared rapidly, but the output signal x'(n) is not constant when the information signal x(n) is indeed constant. For that reason, as remarked in the foregoing, the picture quality is unacceptable at a low value of the weighting factor a(1).

(2). Improvements to the DPCM transmission system

Figure 7:
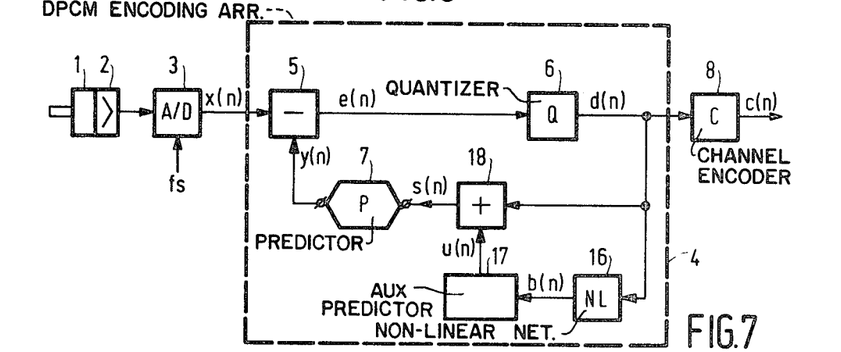
Figure 8:
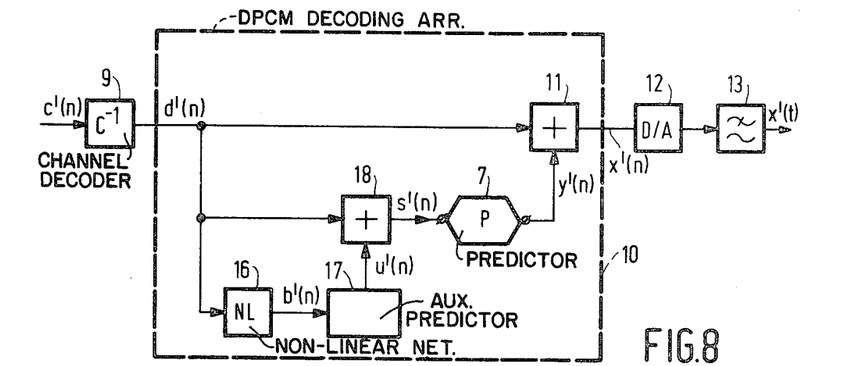
FIG. 8 shows a receiver of the DPCM transmission system in accordance with the invention.

The disadvantageous properties, described in the preceding paragraph of the prior art DPCM transmission system, can be eliminated to a very great extent by implementing the transmitter and the receiver of this transmission system in the manner shown in FIG. 7 and FIG. 8, respectively. The transmitter shown in FIG. 7 differs from the transmitter shown in FIG. 1 in that the quantized difference signal d(n) is not only applied to the prediction circuit 7, but is now also applied to a non-linear network 16. This network 16 produces an output signal b(n) which is applied to an auxiliary prediction circuit 17, which, in response to this signal b(n), produces an auxiliary prediction signal u(n). This auxiliary prediction signal u(n) is added in an adder 18 to the quantized difference signal d(n) and the sum signal s(n) is applied to the prediction circuit 7. The receiver shown in FIG. 8 differs in the same manner from the receiver shown in FIG. 2. The non-linear network 16 then produces the output signal b'(n), the auxiliary prediction circuit 17 produces the auxiliary prediction signal u'(n) and the adder 18 produces the sum signal s'(n).

The non-linear network 16 preforms a non-linear processing operation on the instantaneous value of the signal d(n) or d'(n), as the case may be. The relationship between its input signal b(n) and its output signal d(n) can mathematically be described by the expression:

$$b(n) = \begin{cases} \frac{1}{A} d(n) & \text{for } |d(n)| \leq a \\ \frac{a}{A} \text{sign}\{d(n)\} & \text{for } |d(n)| > a \end{cases} \quad (2)$$

Figure 9:
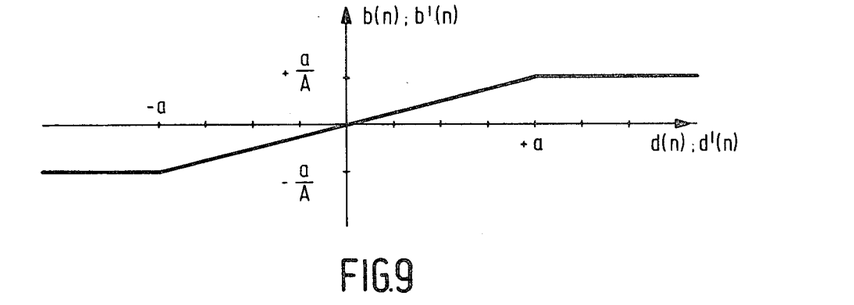
Figure 10:
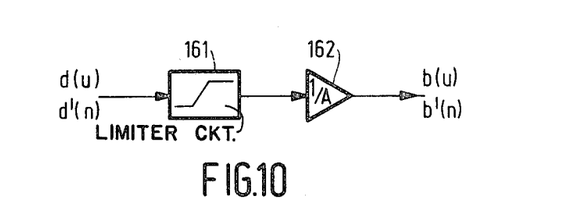
FIG. 10 a possible embodiment of the non-linear network used in the transmission system in accordance with the invention.

By replacing in the above expression b(n) by b'(n) and d(n) by d'(n), this expression also describes the relationship between b'(n) and d'(n). In this expression (2) a and A represent positive constants and the quantity sign {d(n)} represents the polarity of d(n). This expression is graphically shown in FIG. 9. A practical implementation of this non-linear network is schematically shown in FIG. 10 and is provided by a limiter circuit 161, having a limiting level a, followed by a constant factor multiplier 162 having a constant multiplying factor 1/A.

The auxiliary prediction circuit 17 can be implemented in different manners. A number of these implementation possibilities will be further described hereinafter. In the first instance, let it be assumed that they are of a similar structure as the prediction circuit 7.

Also, when the general structure of this auxiliary prediction circuit 17 is the same as that of the prediction circuit 7, its implementation requires, however, fewer components. In practice, it has been found that for the representation of the weighting factors in this auxiliary prediction circuit 17, a considerably lower number of bits is sufficient than is the case for the prediction circuit 7. In the prediction circuit 7 these weighting factors must be represented by 12 or 14 bits, while for the representation of the weighting factors associated with the auxiliary prediction circuit, 7 or 8 bits have been found to be amply sufficient.

In order to obtain an impression of the operation of this novel DPCM transmission system, let it be assumed that both the auxiliary prediction circuit 17 and the prediction circuit 7 are implemented in the manner shown in FIG. 3, the different quantities having been chosen as follows:

$$\tau(1) = T \quad (3)$$
$$a(1) = \alpha \text{ for the prediction circuit 7}$$
$$= \beta \text{ for the auxiliary prediction circuit 17}$$
$$a(k) = 0 \text{ for } k \neq 1$$

In order to keep the number of picture elements which are disturbed as results of a transmission error, as small as possible and to limit the loss of picture quality, in an embodiment which has been tested in practice, $\alpha$ has been chosen equal to 0.7 and $\beta$ equal to 0.95.

Figure 11:
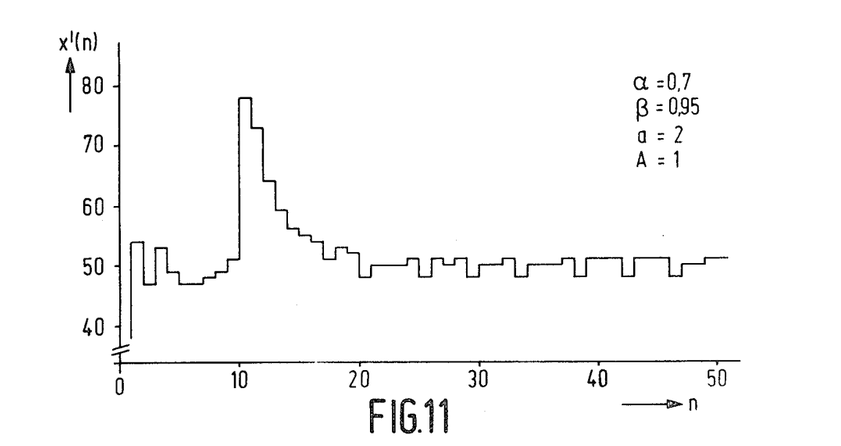
FIG. 11 shows a diagram illustrating the operation of the transmission system in accordance with the invention.

When, to the DPCM transmission system thus defined, an information signal x(n) is applied for which it holds, as in the foregoing, that:

$$x(n) = 50 \text{ for } n \geq 0$$

while $$y(n) = 0$$

$$y'(n) = 0$$

and, owing to a transmission error, c(10)= +4, then the output signal x'(n) has the form shown in FIG. 11.

When now the signal x'(n) shown in FIG. 11 is compared with the signals shown in FIGS. 5 and 6, then it will be apparent that in the DPCM transmission system shown in the FIGS. 7 and 8, the influence of a transmission error disappears very rapidly without the picture quality being noticeably affected thereby. The fast disappearance of the transmission error must be attributed to the fact that a weighting factor which is relatively small is used in the prediction circuit 7. The loss of picture quality which would be the result thereof is now counteracted by the auxiliary prediction circuit 17.

(3) Alternative embodiments of the auxiliary prediction circuit

In the preceding paragraph, it was assumed that the prediction circuit 7 effects a one-dimensional prediction. The auxiliary prediction circuit 17 can then be of such a structure that it also effects only a one-dimensional prediction.

Figure 12:
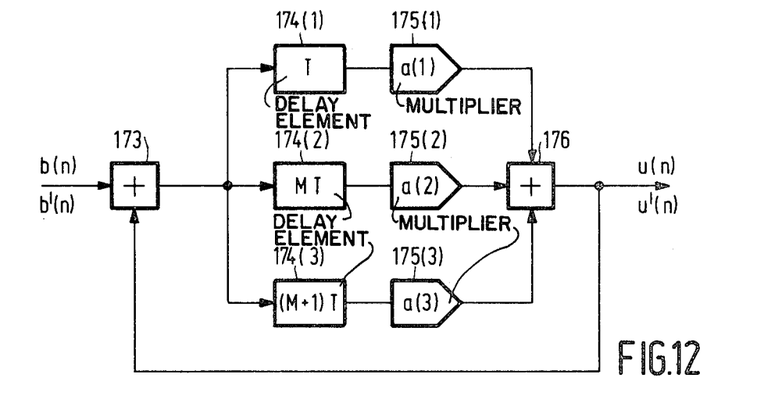
FIGS. 12, 13, 14, 15, 16 show further embodiments of the auxiliary prediction circuit used in the transmission system in accordance with the invention.

When the prediction circuit 7 effects a two-dimensional prediction, then it is recommendable to implement the auxiliary prediction circuit 17 in such a manner that also a two-dimensional prediction is effected therein. In other words: it is advantageous to choose the same structure for the prediction circuit 7 and the auxiliary prediction circuit 17. An auxiliary prediction circuit based on two-dimensional prediction is shown in FIG. 12. The auxiliary prediction circuit thus constructed can be directly derived from the prediction circuit 7 shown in FIG. 3; namely by choosing therein the different quantities to be as follows:

$$N=3$$
$$\tau(1)=T$$
$$\tau(2)=MT=H$$
$$\tau(3)=(M+1)T=H+T$$

Herein M represents the number in picture elements of a line.

Figure 13:
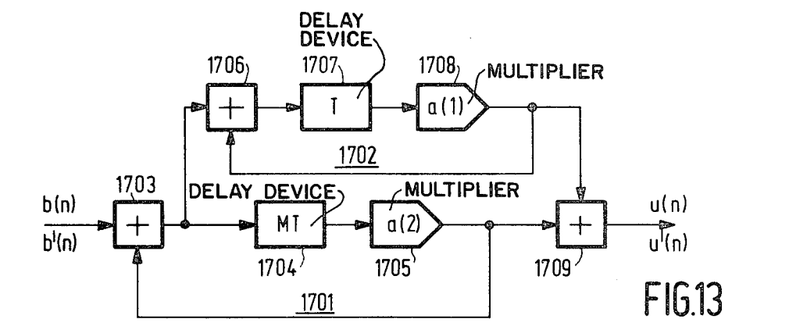

The auxiliary prediction circuit shown in FIG. 12 comprises adders 173 and 176, delay elements 174(.) and multipliers 175(.). In practice a(3) is chosen such that a(3)=−a(1). a(2), the sum of these weighting factors being, for example, approximately equal to 0.95. On this condition, the auxiliary prediction circuit can be simplified to the circuit shown in FIG. 13. More specifically, it comprises two recursive digital filters 1701 and 1702. The filter 1701 is formed by an adder 1703, a delay device 1704 and a multiplier 1705. The signal b(n) (or b'(n)) and the output signal of the multiplier 1705 are applied to the adder 1703. The delay device 1704 has a time delay MT which is equal to one line period (H) of the television picture. The second filter 1702 is formed by an adder 1706, a delay device 1707 and a multiplier 1708. The output signal of adder 1703 and the output signal of multiplier 1708 are applied to the adder 1706. The delay device 1707 has a time delay T. Associated with the two multipliers 1705 and 1708 are the constant multiplying factors a(2) and a(1), respectively, and the output signals of these two multipliers are added together in an adder 1709, which thus produces the auxiliary prediction signals u(n) and u'(n), respectively.

It has been found in practice that the signals u(n) and u'(n) change only very slowly, as the amplitude of the signals b(n) and b'(n), respectively, are limited. This fact can be utilized to reduce the number of delay elements from which the delay device 1704 is formed, so that a further saving in equipment is accomplished. More particularly, it has namely been found that the delay device 1704 which is used in FIG. 13 and is formed by M delay elements, each having a time delay T, can be replaced in the manner shown in FIG. 14 by a filter 1710, a delay device 1711, a low-pass filter 1712, and a delay device 1713.

Figure 14:
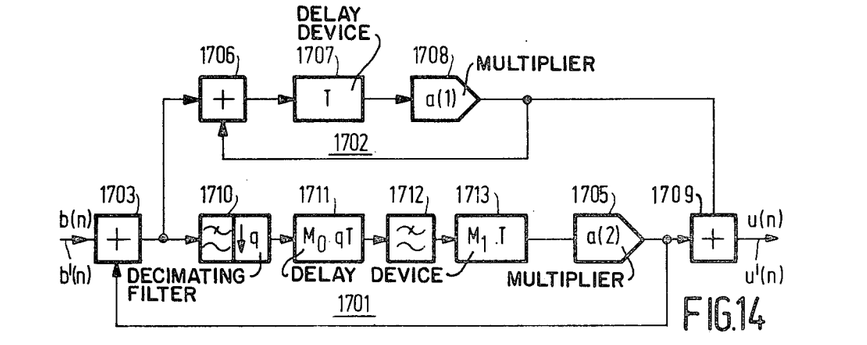

The filter 1710 reduces the sampling frequency of the signal applied to it by a factor of q. These filters are known from the field of digital signal processing and are sometimes designated as decimating filters or "Sample Rate Reduction Filters". The quantity q is an integer and may in practice have the value sixteen. The delay devices 1711 and 1713 each have a number of delay elements determined by the number of picture elements M of a line. Let it be assumed that: $M = M_o q + M_1$, wherein $M_1$ is an integer not divisible by q. As the total time delay in the filter must be equal to MT, the delay device 1711 may comprise $M_o$ delay elements, each having a time delay qT and the delay device 1713 may comprise $M_1$ delay elements, each having a time delay T. The low-pass filter 1712, which is of a digital implementation, has a cutoff frequency of $f_s/2q$.

Figure 15:
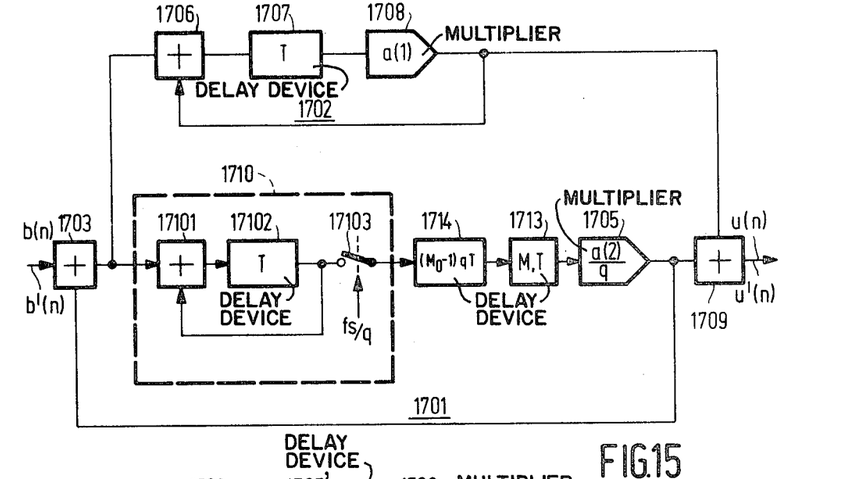

Further investigations have shown that the auxiliary prediction circuit shown in FIG. 14 can be still further simplified, namely to the circuit shown in FIG. 15. This auxiliary prediction circuit shown in FIG. 15 differs from the auxiliary prediction circuit shown in FIG. 14 in that the filter 1710 is now in the form of an accumulator circuit provided by an adder 17101 and a delay device 17102 having a time delay T. The content of this delay device 17102 is applied to a delay device 1714 at a rate fs/q. This is schematically shown in the Figure by means of the switch 17103. After the content of the accumulator circuit has been transferred to the delay device 1714, the accumulator circuit is reset. Since the filter 1710 is now provided by an accumulator, the low-pass filter 1712 of FIG. 14 is no longer required. Since the accumulator comprises a delay device having a time delay T, which at the output of switch 17103 appears to have the magnitude qT, a time delay $(M_o-1).qT$ can be assigned to the delay device 1714, and this delay device 1714 may be assembled from $M_o-1$ delay elements, each having a time delay qT. Furthermore the multiplier 1705 now has the multiplying factor a(2)/q.

It should further be noted that in practice the adder arrangement 1709 has proved to be superfluous in the auxiliary prediction circuits of FIGS. 14 and 15. It has namely been found that the output signal of the multiplier 1708 can be directly utilized as the auxiliary prediction signal.

Figure 16:
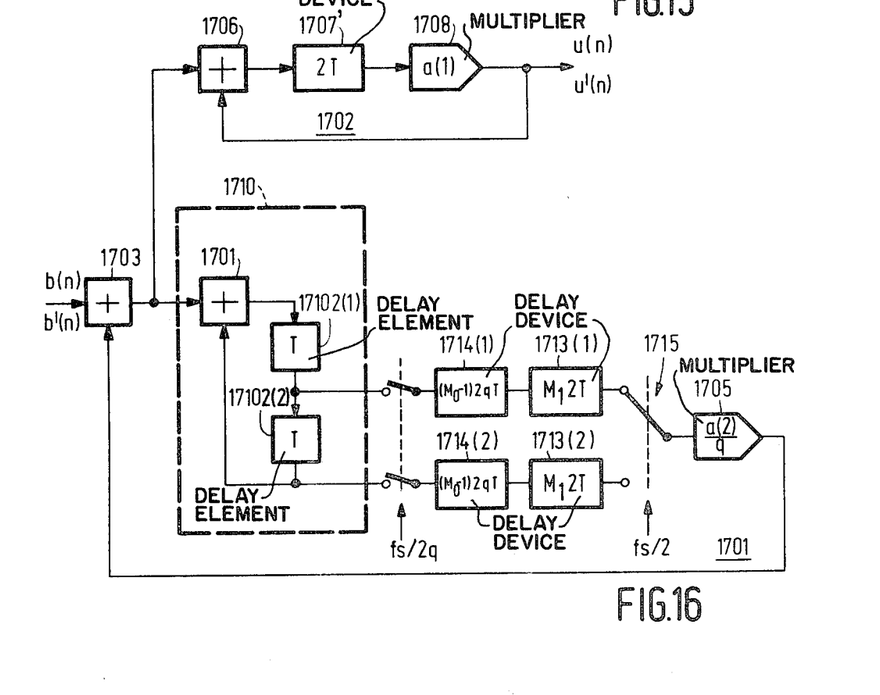

In the foregoing it was tacitly assumed that the video signal to be transmitted was a black/white video signal. In the event that this video signal is a composite color video signal, the prediction circuit 7 may, for the purpose of two-dimensional prediction, have the same construction as that shown in FIG. 12. If then, as is currently customary, the sampling frequency $f_3$ is chosen such that it is equal to twice the color subcarrier $f_{sc}$, then the delay devices 174(1), 174(2), 174(3) must produce the time delay 2T, (2M−1)T, (2M+1)T, respectively. The auxiliary prediction circuit 17 may alternatively be constructed in the manner shown in FIG. 16. The auxiliary prediction circuit shown there corresponds in broad outlines with the auxiliary prediction circuit shown in FIG. 15. It differs therefrom however in the following respects. The time delay of the delay device 1707' in the second filter 1702 is now equal to 2T. In the accumulator circuit 1710, the delay device 17102 is now provided by a cascade arrangement of two delay elements 17102(1) and 17102(2), each having a time delay T. The contents of each of the delay elements 17102(1) and 17102(2) are applied at a rate fs/2q to delay devices 1714(1) and 1714(2) which each have a time delay $(M_o-1)q2T$ and which may each be formed by $M_o-1$ delay elements. As in the embodiment shown in FIG. 15, each of the delay devices 1714(.) is followed by a delay device 1713(1), which has a time delay $M_1 2T$ and may be formed from $M_1$ delay elements having a time delay 2T. After the contents of the delay elements 17102(.) have been transferred to the delay devices 1714(.), the delay devices 17102(.) are reset. The multiplier 1705, which now has also a constant multiplying factor a(2)/q, is now alternately connected to the output of the delay devices 1713(1) and 1713(2) at a rate fs/2. This is schematically shown in FIG. 16 by means of the switch 1715, which is controlled by a clock signal fs/2.

What is claimed is:

1. A differential pulse code modulation (DPCM) transmission system comprising a transmitter and a receiver, A. the transmitter comprising:
  a1. means for generating an information signal to be transmitted;
  a2. a DPCM encoding arrangement comprising:
    aa1. a difference producer to which there are applied via a first input the information signal to be transmitted and via a second input a first prediction signal for generating a difference signal;
    aa2. a quantizing arrangement to which the difference signal is applied and which produces a quantized difference signal;
    aa3. a first prediction circuit for generating the first prediction signal and having an input to which the quantized difference signal is applied, also having an output coupled to the second input of the difference producer;

a3. a channel encoding circuit for converting the quantized difference signal into a digital channel signal;

B. the receiver comprising:

b1. a channel decoding circuit for converting the rereceived digital channel signal into a decoded channel signal;

b2. a DPCM decoding arrangement comprising:

bb1. a sum producer to which the decoded channel signal is applied via a first input and a second prediction signal via a second input;

bb2. a second prediction circuit for generating the second prediction signal and having an input to which the decoded channel signal is applied, also having an output coupled to the second input of the sum producer;

b3. means for processing the sum signal produced by the sum producer, characterized in that the DPCM encoding and decoding arrangements each further comprise:

C1. a non-linear network having an input and an output, the quantized difference signal or the decoded channel signal, respectively, being applied to said input and this network performing a non-linear processing operation on the instantaneous value of the signal applied thereto;

C2. an auxiliary prediction circuit for generating an auxiliary prediction signal for generating an auxiliary prediction signal and having an input and an output, the input being connected to the output of the non-linear network;

C3. means for adding the auxiliary prediction signal to the quantized difference signal applied to the first prediction circuit and to the decoded channel signal applied to the second prediction circuit, respectively.

2. A transmission system as claimed in claim 1, characterized in that the relationship between the input signal R(n) of the non-linear network and its output signal W(n) is given by the expression $$W(n) = \begin{cases} \frac{1}{A} R(n) & \text{if } |R(n)| \leq a \\ \frac{a}{A} \text{sign}\{R(n)\} & \text{if } |R(n)| > a \end{cases}$$

wherein a and A represent positive constants and sign $\{R(n)\}$ represents the polarity of R(n).

3. A transmission system as claimed in claim 1, characterized in that the auxiliary prediction circuit comprises a first and a second recursive digital filter.

4. A transmission system as claimed in claim 3, characterized in that the first and second recursive digital filters are each provided by an adder arrangement having a first and a second input and an output; a delay device the input of which is connected to the output of the adder arrangement; a constant factor multiplier which has an input connected to an output of the delay device and an output to the first input of the adder arrangement.

5. A transmission system as claimed in claim 4, characterized in that the second input of the adder arrangement of the second recursive digital filter is connected to the output of the adder arrangement of the first recursive digital filter.

6. A transmission system as claimed in claim 4, characterized in that a decimating filter arrangement is included in the first recursive digital filter preceding the delay device.

* * * * *